Inventors
JEAN L. RIBOUR
HENRY F. GARIN
By Percy P. Lantzy
Attorney

Inventors
JEAN L. RIBOUR
HENRY F. GARIN
By [signature]
Attorney

8 CYCLES. MAKE UP TO HUNDREDS

UNITS: 6

| U | $S_u$ | $N_u$ | FINISH OF COUNT | | DISPLAY |
|---|---|---|---|---|---|
| 0 | 6 | 6 | 5 | 1010 | 0101 |
| 1 | | 7 | 6 | 0110 | 1001 |
| 2 | | 8 | 7 | 1110 | 0001 |
| 3 | | 9 | 8 | 0001 | 1110 |
| 4 | | 10 | 9 | 1001 | 0110 |
| 5 | | 11 | 10 | 0101 | 1010 |
| 6 | | 12 | 11 | 1101 | 0010 |
| 7 | | 13 | 12 | 0011 | 1100 |
| 8 | | 14 | 13 | 1011 | 0100 |
| 9 | | 15 | 14 | 0111 | 1000 |

Fig. 2A

TENS: 38.

| D | $S_d$ | $N_d$ | FINISH OF COUNT | | DISPLAY |
|---|---|---|---|---|---|
| 0 | 38 | 38 | 37 | 1010010 | .101101 |
| 1 | | 48 | 47 | 1111010 | .000101 |
| 2 | | 58 | 57 | 1001110 | .110001 |
| 3 | | 68 | 67 | 1100001 | .011110 |
| 4 | | 78 | 77 | 1011001 | .100110 |
| 5 | | 88 | 87 | 1110101 | .001010 |
| 6 | | 98 | 97 | 1000011 | .111100 |
| 7 | | 108 | 107 | 1101011 | .010100 |
| 8 | | 118 | 117 | 1010111 | .101000 |
| 9 | | 128 | 127 | 1111111 | ....... |

MAKE UP CYCLE 11 OR 31.

| $N_p$ | FINISH OF COUNT | | DISPLAY |
|---|---|---|---|
| 11 | 10 | 01010 | ..1.1 |
| 31 | 30 | 01111 | ..0.0 |

HUNDREDS: 44 (= 6 + 38)

| C | Dpt | $N_c$ | FINISH OF COUNT | | DISPLAY | $N_p$ | $N_{ct}$ |
|---|---|---|---|---|---|---|---|
| 1 | 75 | 25 | 4 × 5 | 0010000 | ...1111 | 31 | 56 |
| 2 | 55 | 145 | 28 × 5 | 0011100 | ...0011 | 11 | 156 |
| 3 | 75 | 225 | 44 × 5 | 0011010 | ...0101 | 31 | 256 |
| 4 | 55 | 345 | 68 × 5 | 0010001 | ...1110 | 11 | 356 |
| 5 | 75 | 425 | 84 × 5 | 0010101 | ...1010 | 31 | 456 |

Inventors
JEAN L. RIBOUR
HENRY F. GARIN
By [signature]
Attorney

Inventors
JEAN L. RIBOUR
HENRY F. GARIN
By Percy P. Lantzy
Attorney

8 CYCLES. MAKE UP TO UNITS

UNITS : 27

| U | $S_u$ | $N_u$ | FINISH OF COUNT | | DISPLAY | $N_p$ | $N_{ut}$ |
|---|---|---|---|---|---|---|---|
| 0 | | 4 | 3 | 1100 | 0011 | | 27 |
| 1 | | 5 | 4 | 0010 | 1101 | | 28 |
| 2 | 4 | 6 | 5 | 1010 | 0101 | 23 | 29 |
| 3 | | 7 | 6 | 0110 | 1001 | | 30 |
| 4 | | 8 | 7 | 1110 | 0001 | | 31 |
| 5 | | 11 | 10 | 0101 | 1010 | | 32 |
| 6 | | 12 | 11 | 1101 | 0010 | | 33 |
| 7 | 6 | 13 | 12 | 0011 | 1100 | 21 | 34 |
| 8 | | 14 | 13 | 1011 | 0100 | | 35 |
| 9 | | 15 | 14 | 0111 | 1000 | | 36 |

MAKE UP CYCLE : 21 OR 23

| $N_p$ | FINISH OF COUNT | | DISPLAY |
|---|---|---|---|
| 21 | 20 | 00101 | . 1 . . . |
| 23 | 22 | 01101 | . . . . . |

Fig.3A

TENS : 38

| D | $S_d$ | $N_d$ | FINISH OF COUNT | | DISPLAY |
|---|---|---|---|---|---|
| 0 | | 38 | 37 | 1010010 | .101101 |
| 1 | | 48 | 47 | 1111010 | .000101 |
| 2 | | 58 | 57 | 1001110 | .110001 |
| 3 | | 68 | 67 | 1100001 | .011110 |
| 4 | 38 | 78 | 77 | 1011001 | .100110 |
| 5 | | 88 | 87 | 1110101 | .001010 |
| 6 | | 98 | 97 | 1000011 | .111100 |
| 7 | | 108 | 107 | 1101011 | .010100 |
| 8 | | 118 | 117 | 1010111 | .101000 |
| 9 | | 128 | 127 | 1111111 | ....... |

HUNDREDS : 65 (= 27 + 38)

| C | $D_{pt}$ | $N_c$ | FINISH OF COUNT | | DISPLAY |
|---|---|---|---|---|---|
| 1 | | 35 | 6 × 5 | 0110000 | ..01111 |
| 2 | | 135 | 26 × 5 | 0101100 | ..10011 |
| 3 | 65 | 235 | 46 × 5 | 0111010 | ..00101 |
| 4 | | 335 | 66 × 5 | 0100001 | ..11110 |
| 5 | | 435 | 86 × 5 | 0110101 | ..01010 |

Inventors
JEAN L. RIBOUR
HENRY F. GARIN
By [signature]
Attorney

Inventors
JEAN L. RIBOUR
HENRY F. GARIN
By [signature]
Attorney 2 x 8 CYCLES. *MAKE UP TO UNITS & TENS*

*UNITS:* 22.

| U | Su | Nu | *FINISH OF COUNT* | | *DISPLAY* | Np1 | Nut |
|---|---|---|---|---|---|---|---|
| 0 | 20 | 20 | 9 + 9 | 1 0 0 1 | 0 11. | 2 | 22 |
| 1 | } 22 | 23 | 11 + 10 | (1)1 0 1 | } (1) 01. | } 0 | 23 |
| 2 | | 24 | 11 + 11 | 1 1 0 1 | | | 24 |
| 3 | } 20 | 23 | 11 + 10 | (1)1 0 1 | | } 2 | 25 |
| 4 | | 24 | 11 + 11 | 1 1 0 1 | | | 26 |
| 5 | } 22 | 27 | 13 + 12 | (1)0 1 1 | } (1) 10. | } 0 | 27 |
| 6 | | 28 | 13 + 13 | 1 0 1 1 | | | 28 |
| 7 | } 20 | 27 | 13 + 12 | (1)0 1 1 | | } 2 | 29 |
| 8 | | 28 | 13 + 13 | 1 0 1 1 | | | 30 |
| 9 | 22 | 31 | 15 + 14 | (1)1 1 1 | (1) 00. | 0 | 31 |

*TENS* : 38.

| D | Sd | Nd | *FINISH OF COUNT* | | *DISPLAY* | Np2 | Ndt |
|---|---|---|---|---|---|---|---|
| 0 | 24 | 24 | 11 × 2 | 1 1 0 1 0 0 | 0 . 1 0 1 1 | 14 | 38 |
| 1 | } 28 | 38 | 18 × 2 | 0 1 0 0 1 0 | 1 . 1 1 0 1 | } 10 | 48 |
| 2 | | 48 | 23 × 2 | 1 1 1 0 1 0 | 0 . 0 1 0 1 | | 58 |
| 3 | } 24 | 54 | 26 × 2 | 0 1 0 1 1 0 | 1 . 1 0 0 1 | } 14 | 68 |
| 4 | | 64 | 31 × 2 | 1 1 1 1 1 0 | 0 . 0 0 0 1 | | 78 |
| 5 | } 28 | 78 | 38 × 2 | 0 1 1 0 0 1 | 1 . 0 1 1 0 | } 10 | 88 |
| 6 | | 88 | 43 × 2 | 1 1 0 1 0 1 | 0 . 1 0 1 0 | | 98 |
| 7 | } 24 | 94 | 46 × 2 | 0 1 1 1 0 1 | 1 . 0 0 1 0 | } 14 | 108 |
| 8 | | 104 | 51 × 2 | 1 1 0 0 1 1 | 0 . 1 1 0 0 | | 118 |
| 9 | 28 | 118 | 58 × 2 | 0 1 0 1 1 1 | 1 . 1 0 0 0 | 10 | 128 |

Fig. 4A

*MAKE UP CYCLE :* 10, 12, 14 16.

| Np1 | | Np2 | | Np | *FINISH OF COUNT* | | *DISPLAY* |
|---|---|---|---|---|---|---|---|
| 0 | + | 10/14 | = | 10/14 | 4/6 × 2 | 0 (1) 1 | 1 (1). |
| 2 | + | 10/14 | = | 12/16 | 5/7 × 2 | 1 (1) 1 | 0 (1). |

*HUNDREDS:* 60 (= 22 + 38)

| C | Dpt | Nc | *FINISH OF COUNT* | | *DISPLAY* |
|---|---|---|---|---|---|
| 1 | } 60 | 40 | 3 × 10 | 1 1 0 0 0 0 | . 0 1 1 1 1 |
| 2 | | 140 | 13 × 10 | 1 0 1 1 0 0 | . 1 0 0 1 1 |
| 3 | | 240 | 23 × 10 | 1 1 1 0 1 0 | . 0 0 1 0 1 |
| 4 | | 340 | 33 × 10 | 1 0 0 0 0 1 | . 1 1 1 1 0 |
| 5 | | 440 | 43 × 10 | 1 1 0 1 0 1 | . 0 1 0 1 0 |

*Inventors*
*JEAN L. RIBOUR*
*HENRY F. GARIN*
*By* [signature]
*Attorney*

United States Patent Office 3,375,449

Patented Mar. 26, 1968

3,375,449

FREQUENCY DIVIDER WITH VARIABLE DIGITAL RATIO

Jean Louis Ribour, Boulogne-Billancourt, and Henry Fernand Garin, Paris, France, assignors to International Standard Electric Corporation, New York, N.Y., a corporation of Delaware Filed May 12, 1965, Ser. No. 455,099
5 Claims. (Cl. 328—48)

The present invention concerns frequency dividers with variable digital ratio, of the kind used to reduce or gear down the frequency of a sequence of pulses. Frequency dividers of this kind are used, for instance, in oscillators with variable frequency, such as the one described in French Patent No. 1,396,537 to "Le Matériel Téléphonique" for "A Variable High Frequency Synchronized Oscillator." They count the incoming pulses up to a variable number N and they deliver an outgoing pulse every time this count is reached, so that the sequence of outgoing pulses is delivered at a frequency reduced in the ratio $1/N$. The restarts of the counting cycles, which comprise starting the end of count, stopping the counting, clearing the reached count and resuming the counting, including a relatively long series of elementary operations such as the operation of electronic gates, flip-flops etc. When one wants to use frequency dividers of this kind to reduce a frequency in the megahertz range or higher, in a variable ratio ranging about several hundreds—which is the case, for instance, in the above mentioned oscillator—an essential problem consists in effecting the restarts of counting without introducing errors in the counting of incoming pulses.

To make the insertion of these operations easier, it has already been proposed to spread them on two or three pulses and the intervals between them by starting the ends of count one or two pulses before the required count is reached. It also has been proposed to articulate the counting device in two counters working alternatively. These processes or devices leave more time for the operations of restarts of counting without shortening these operations because the capacity of the counters, thus the number of their flip-flops in cascade, have always to cover the numbers to be counted. On the other hand, the counting of the displayed variable number has been obtained by a variable preadjustment of the starting position, complementary to the number to be counted, i.e. by an active operation effected for each restart and implying an operation time added to the others.

The present invention provides a frequency divider with a variable digital ratio, which is articulated in such a way as to diminish the capacity of the counter and thus shorten the operation time of the restarts of counting and more particularly the stating of the ends of counts. On the other hand, the variable number to be counted is introduced into the device by a passive operation which has no effect on the counter and takes no time in the counting-cycle restarts. The counter always resumes the counting from a fixed position, namely the zero position. It is known that resetting can be effected by a parallel signal sent to all stages of the counter, hence in a single elementary time-period. Moreover, the invention allows checking of effective resetting for each restart of counting. On the other hand, the operations of restart of counting are spread, in the known way, on the last pulses of a count or on the intervals between them.

According to one feature of the invention, the displayed number is counted each time in several "position cycles" on a pulse counter of reduced capacity. These position cycles are counted in turn and adjusted as regards the respective numbers to be counted, by means of a program unit whose stepping from one position to another is controlled each time by a signal delivered at the end of a position cycle. The program unit delivers an outgoing pulse during each cycle of its program. The operations of restart of counting on the pulse counter are simplified and shortened owing to the simple fact that this counter has a reduced capacity (it will be seen later on that the invention permits the time of starting the ends of count to be still shortened). On the other hand, the program unit is preferably a cyclic counter, each position of which controls a cycle of the pulse counter. In this way, the program unit operates without any special operation to restart the program cycle.

According to another feature of the invention, which applies when the reduction ratio is displayed on several display positions (units, tens, hundreds, etc. . . .), the program unit assigns and subordinates each position cycle to a display position.

According to another feature, the numbers of pulses corresponding to the higher display positions (hundreds or thousands) are counted in several position cycles which are preferably equal to each other. This allows the counting of these numbers with a pulse counter whose capacity is several times smaller. According to another feature, some other numbers of pulses than those displayed on the display positions are assigned to these display positions. At least one make-up cycle is provided to make the total number of pulses contained in the position cycles equal to the number displayed on the set of the display positions. According to another feature, the counting program is composed of pairs of equal half-position cycles (or "half-cycles"), and the program unit carries out the whole sequence of the first half-position cycles in a first half-program, then it carries out the whole sequence of the second half-position cycles in a second half-program, so that both half-programs contain the same number of pulses. The two alternations of each outgoing pulse are delivered during these two equal half-programs, so that the reduced frequency is represented by a sequence of "square" pulses. This waveform facilitates the formation of a sine wave, but more especially the generation of its harmonics, when that is the case.

According to another feature of the invention, which applies when the pulse counter would mark a whole group of wires when the count would reach its capacity, a display translator is associated with each display position, which sets in before a variable make-up marking on some of these wires, so that this whole group of wires will be marked when the counter will reach the variable count assigned to the displayed digit, starting from zero, to deliver then an end-of-count signal. In one embodiment, such a group of wires is associated to each display translator, and the pulse counter terminals are multipled on all these groups of wires. In this way, the variable marking set in each group by the corresponding display translator combines separately with the marking produced by the counter in the corresponding position cycle.

According to another feature of the invention, an end-of-count switching is effected after the penultimate pulse of the number assigned to each position cycle. This switching is such that the next pulse (the last of this number) will operate the resetting of the pulse counter. A return switching is effected after this last pulse, so that the next pulses will be counted again starting from zero in the next position cycle. An end-of-cycle signal is put out by this double switching and is applied to the program unit to make it step one position forward. According to another feature, each display translator sets a make-up marking in such a way that the whole group of wires mentioned above will be marked when the count will reach the assigned number of pulses but one.

In one embodiment of the invention, an "AND" gate is controlled by the whole group of wires mentioned above, and is locked during each incoming pulse, to deliver an end-of-count signal during the interval following the last pulse of the count (i.e. the last but one of the assigned number). When there are several groups of wires associated with the display translators, an "AND" gate is associated with each group of wires, and its output is controlled by the program unit so as to deliver an end-of-count signal during the cycle which depends on the corresponding display translator. According to another feature, the return switching is controlled by a restart signal which is delivered by an "AND" gate which is controlled by all those outputs of the pulse counter which must restore to the potential of rest when the counter returns to zero. This arrangement allows for checking of the effective resetting of the counter before resuming the counting in the next position cycle. This "AND" gate is locked during each incoming pulse, to deliver the restart signal during the interval following the last pulse of the number assigned to the completed cycle.

Other features and advantages of this invention will appear in the following description with reference to the accompanying drawings, in which:

FIGURE 2A is a corresponding table, giving the number of pulses counted during the position cycles according to the displayed digits;

FIGURE 3A is the corresponding table;

Figure 1:
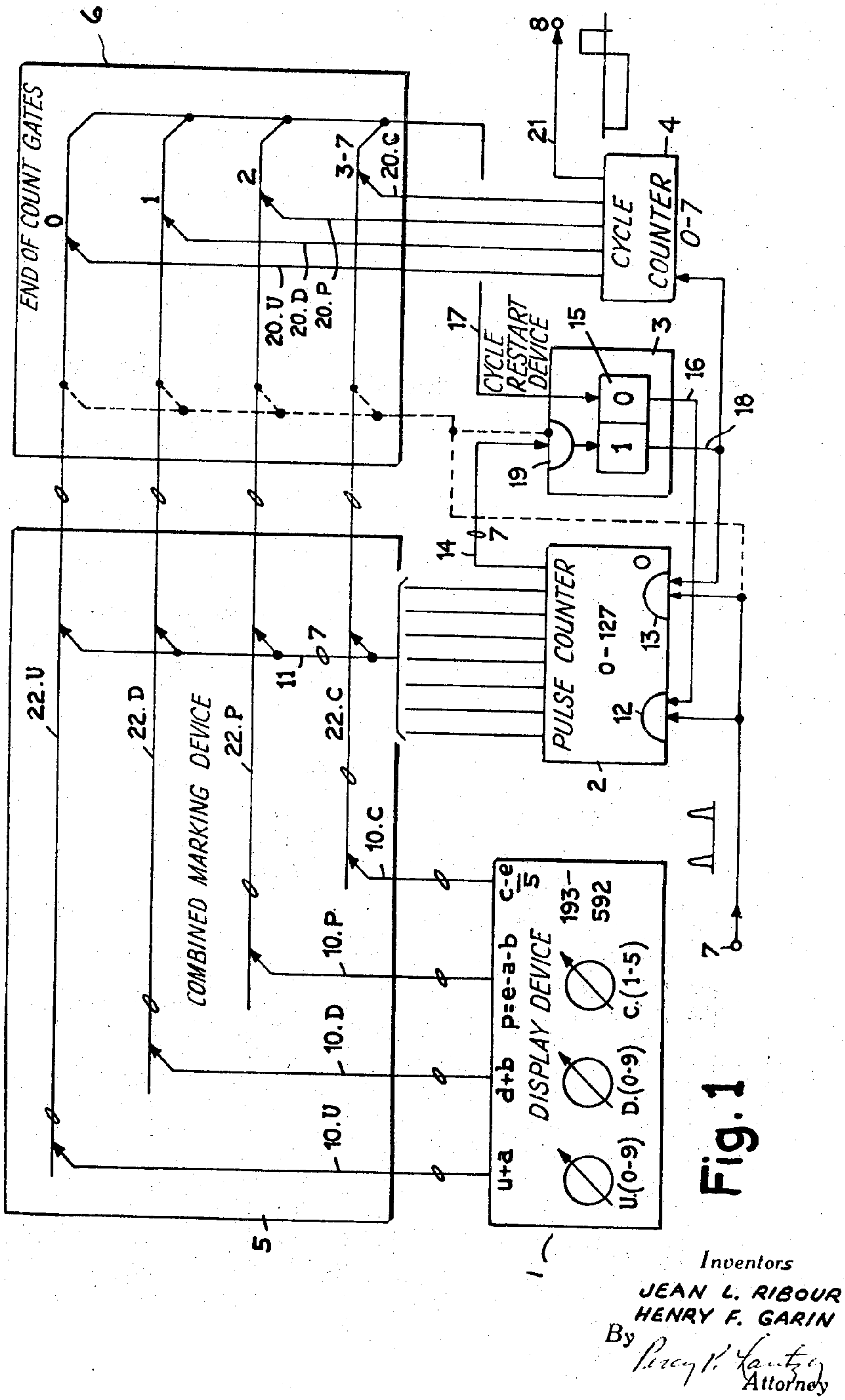
FIGURE 1 is a block diagram of a frequency divider according to the invention.

With reference to FIGURE 1, the frequency divider according to the invention comprises a display device 1, a pulse counter 2, a cycle restart device 3, a cycle counter 4, a combined marking device 5 and an arrangement of end-of-count gates 6. The incoming pulses whose frequency must be lowered in the displayed digital ratio, are applied to input 7 and from there to the pulse counter 2 which counts them in several position cycles. At the end of each position cycle, the arrangement of end-of-count gates 6 sends an end-of-cycle pulse to the cycle restart device 3, which resets the pulse counter 2 and makes the cycle counter 4 step one position forward. The cycle counter is a cyclic counter which operates with no resetting. During each of its own cycles, or program cycles, it delivers a pulse on terminal 8. An output pulse is delivered in this way each time the pulse counter has counted a certain number of pulses during the cycles which correspond to the successive positions of the cycle counter. This number is the reduction ratio of the frequency. The cycle counter has the function of a program unit, for it subordinates the position cycles to determined sections of the marking device, where the numbers of pulses to be counted are determined by a suitable translation of the displayed digits. It will be seen that the program unit can subordinate the pulse counter to the same section of the marking device in several of its own positions.

It will be assumed that the frequency reduction ratio can vary from 193 to 592, as is the case in the embodiment of the variable oscillator described in the above mentioned French patent (pending application). In fact, it is not that reduction ratio which will be displayed in a variable oscillator or in similar pieces of apparatus. Thus, in the said embodiment, the frequency divider must reduce a frequency varying from 1.930 to 5.920 kHz. to a fixed frequency of 10 kHz. when the oscillator will produce a frequency varying from $F+2.000$ to $F+5.999$ kHz., and it is this frequency which will be displayed; but the translation from the number which designs the reduction ratio to a number which designs the working frequency is a trivial operation which is outside the scope of the present description. Therefore it will be assumed here that it is simply the reduction ratio which is displayed, to wit 193 to 592, by means of a units knob U (from 0 to 9), a tens knob D (from 0 to 9) and a hundreds knob C (from 1 to 5). The displaying of a digit on each knob is translated into applying some make-up binary marking to the combined marking device, to determine the counts in one or all the position cycles subordinated to this knob. Complete examples of the kind of translation according to the invention will be seen below; it will suffice here to state that the displayed digits are translated with some extra counts, and that a make-up cycle "P" further counts a number of pulses which can depend on the displayed digits; that all this extra count of pulses is balanced by a "shorting" retained in the hundred count; and that this count is obtained in several position cycles in order to diminish the capacity of the pulse counter.

The units knob, which displays the digit $u$, applies a marking to a bundle 10.U which determines the counting of $u+a$ pulses; likewise, the tens knob, which displays the digit $d$, applies a marking to a bundle 10.D for $10d+b$ pulses; the hundreds knob, which displays the digit $c$, applies a marking to a bundle 10.C for $(100c-e)/n$ pulses (it will be assumed that the counting of hundreds is effected in $n$ equal position cycles); and a make-up marking is applied to a make-up bundle 10.P for $p$ pulses under the control of one or the other knob, depending on the embodiment of the frequency divider. It will be understood that the total number of pulses which will be counted in the successive position cycles of a program cycle will be the displayed number; i.e.

$$a+b+p-e=0$$

Pulse counter 2 is a cascade of flip-flops (seven in the embodiments of FIGS. 2 and 3) which signal the count reached at each instant by means of a binary marking on the wires of bundle 11. Pulses coming from input 7 are applied to a counting gate 12 of this counter, except for the last of the number to be counted, which is applied to a resetting gate 13. When the counter is effectively in its zero position, it marks all the wires of a bundle 14. This marking is applied, for instance, by means of inverters connected to all output terminals of the counter which must be at the potential of rest when the counter is in the zero position. In the normal structure, there will be a wire per counter flip-flop in bundles 11 and 14.

The cycle restart device 3 is essentially a flip-flop 15. The marking at the output terminal "0" is applied through a wire 16 to the counting gate 12, so that counter 2 counts the incoming pulses when flip-flop 15 is in its "0" position. At the end of a position cycle, an end-of-count signal is applied through a wire 17 to the input terminal "0" of flip-flop 15, which then comes to its position "1" and delivers a marking at its output terminal "1." This marking is applied through a wire 18 to the resetting gate 13, so that the next pulse—the last of the number to be counted—resets the counter to its zero position. The counter then delivers a marking on all wires of a bundle 14 which controls a gate 19 of device 3. This gate is controlled in inhibition by the incoming pulses, so that the same pulse which sets the marking on bundle 14 prevents this marking from going beyond this gate. After this pulse, this marking appears at the output of this gate, from which it is applied to the input terminal "1" of flip-flop 15. The latter restores to its "0" position, which again closes gate 13 and again opens gate 12, so that the next incoming pulses from input 7 will be counted again during the new counting cycle. The end-of-count signal on wire 18 is also applied to the input of program unit 4, and makes it step forward to the next position.

Figure 2:
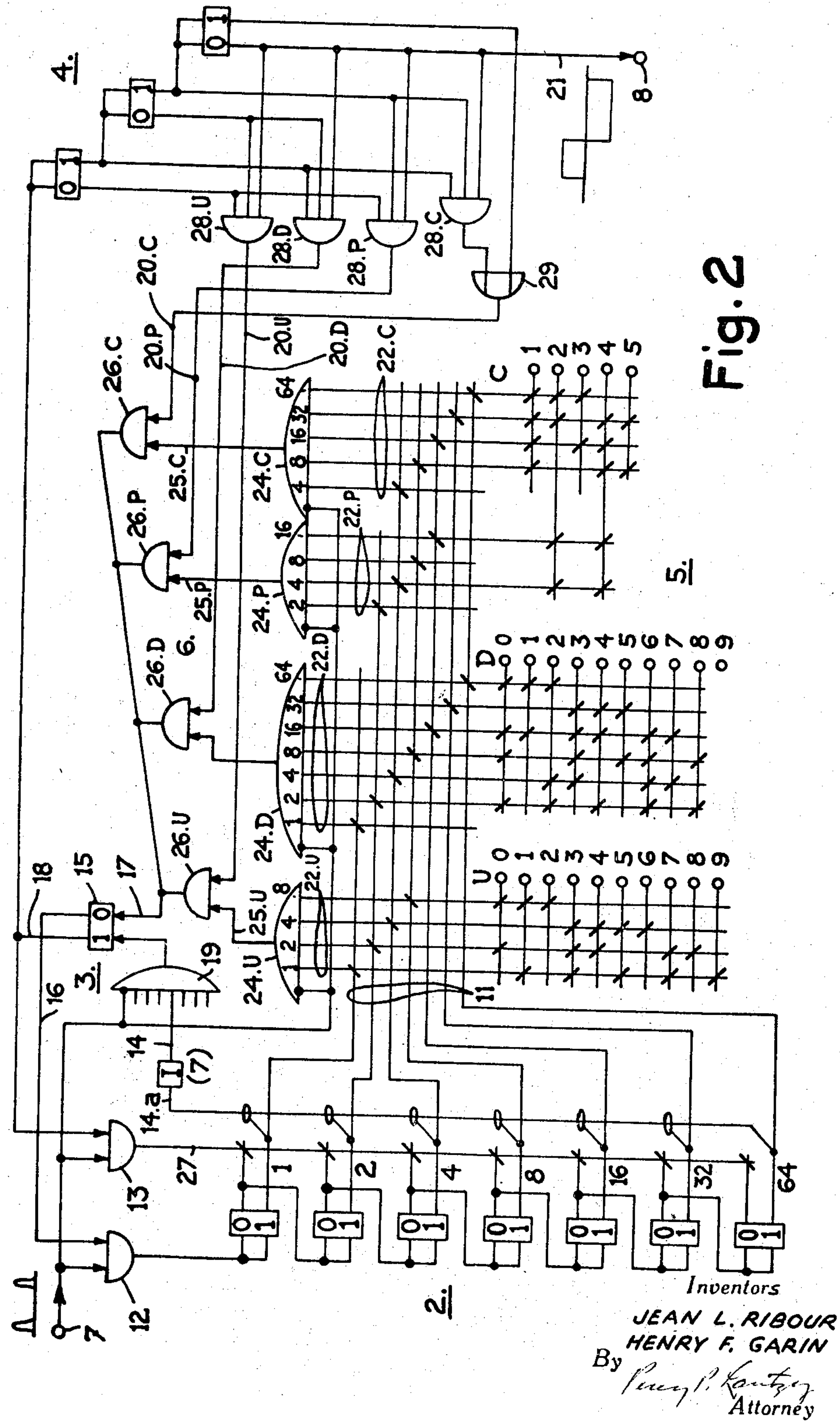
FIGURE 2 is a diagram of the circuits of an embodiment of this frequency divider.
Figure 3:
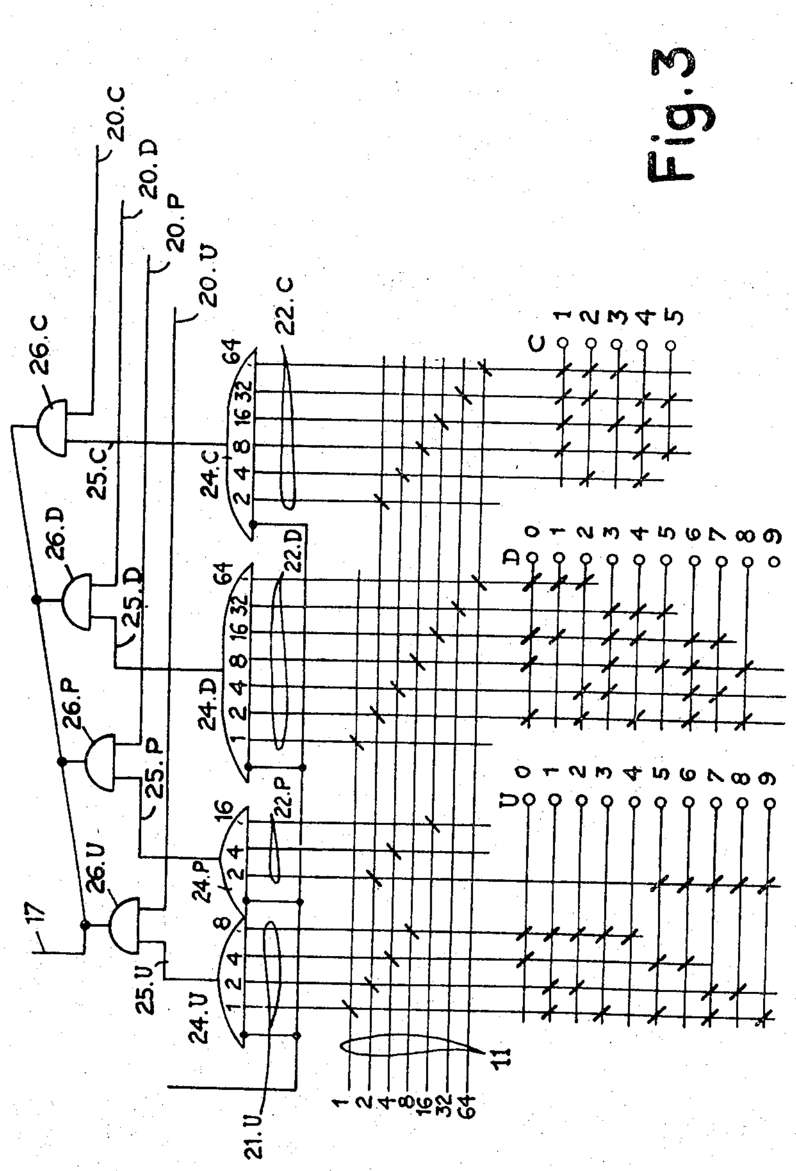
FIGURE 3 is a diagram of the circuits of another embodiment, with other position cycles.

In the embodiments of FIGS. 2 and 3, the program unit is a cyclic counter with three flip-flops and therefore with eight positions. As a cyclic counter, it has only one input, the counting input which receives the end-of-cycle signals. Its operation need not be rapid, because in the embodiments set forth, it does not occur right at the beginning of each position cycle but only at the end; and the position cycles last during at least *a* and *b* or $(100-e)/n$ incoming pulses. In the first three positions ("0, 1, 2"), the program unit delivers a marking on output wires 20.U, 20.D and 20.P to subordinate the count in the first three position cycles to the display positions of units and tens and to the make-up number. In the five other positions ("3 to 7"), it delivers a marking on an output wire 20.C to subordinate the count in the five other position cycles to the display position of hundreds. An output wire 21 connected to the output "0" of the third flip-flop is marked during the first four positions of the program unit ("0 to 3"). Output 8 of the frequency divider is connected to this wire. The reduced frequency is therefore represented by rectangular waves whose alternations will be unequal in the embodiment referred to. For instance, for a reduction ratio of 400, the first four cycles (and the alternation "mark" at output 8) may last about 120 pulses, and the other four (and the alternation "rest"), 280 pulses. One will see hereinafter and other embodiment, in which the program unit will control two series of half-cycles, so that the output frequency will have a square waveform ("mark" and "rest" alternations of equal durations).

In the combined marking device 5, the marking carried by the bundles of translated display 10.U, D, P, C, is applied to totalizing bundles 22.U, D, P, C respectively, on which the counting bundle 11 is itself multiplied by means of appropriate decoupling devices. In this way, when counter 2 has counted, in a position cycle, the number assigned to the digit displayed on the display position which controls this cycle, all the wires of the corresponding totalizing bundle are marked, as if the counter had reached its counting capacity: the number set by the display marking is subtracted from the counting capacity as an extra count to the number effectively counted by the counter. For instance, when in the cycle of tens with the displayed digit "2," the number to be counted, assigned to this digit, will be 57 (in the embodiment of FIG. 2). The binary marking at the output of the counter, in bundle 11, will be then 1001110. In order to stop the counting at this count, all the wires must then be marked in the totalizing bundle 22.D, to wit 1111111 (which corresponds to 127, which is the capacity of a counter with seven flip-flops). The wires which must be marked in the bundle of translated display 10.D for digit "2" are therefore the other wires, to wit 0110001 (which corresponds to 70=127−57). One can see that this way of setting the variable number to be counted is not an operation which would be made on the counter and whose time would add up to the other operation times. One will further see in the embodiment that the totalizing bundles can be incomplete, for it is not necessary to subordinate the statement of an end of count to such binary positions which the counter will reach for none of the displayed digits in a given position cycle, and to those which the translated display should mark for every digit.

The arrangement of end-of-count gates 6 is inserted between the totalizing bundles and a common output 17. The program unit 4 controls this arrangement through the marking of its output wires 20.U, D, P, C, so that the end-of-count signal appears on wire 17 when all the wires are marked in that of totalizing bundles 22.U, D, P, C, which is designated by a marking from the corresponding output of the program unit. One will see in the embodiments that this marking only prepares the passage of the end-of-count signal from one of the totalizing bundles to output 17 without intervening in any other way in the operation of the arrangement of gates. It therefore suffices that the program unit delivers the marking on the specified wire 20.U, D, P or C before the pulse counter reaches its variable count, which is of at least several pulses for any displayed digit. The operation of the program unit can therefore be relatively slow. Moreover, the end-of-count signal is controlled in inhibition by the incoming pulses originating from input 7. The end-of-count signal therefore appears on wire 17 only after the last pulse of the count which is the last but one of the number assigned to the displayed digit. The effects of this signal on flip-flop 15 of the cycle restart device 3 have been seen above.

An embodiment of this frequency divider will now be described referring to FIG. 2. The incoming pulses from input 7 pass, during the counting, through the "AND" gate 12 which, on the other hand, is controlled by wire 16 coming from the "0" output of flip-flop 15. They are applied to the first of the seven flip-flops "1, 2, 4, 8, 16, 32, 64" which constitute pulse counter 2. The latter can then count up to 127 pulses starting from the zero position. In the zero position, all the outputs "1" of the flip-flops are at rest; in position "127," they are all marked. These "1" outputs are connected to the wires of bundle 11 which is multipled on the totalizing bundles 22.U, D, P, C. The suitable decoupling means used for this multiple are figured in the drawing as oblique streaks at the crossing points of the corresponding wires. Display means figured by terminals U.0–9, D.0–9, C.1–5 allow the marking of combinations of wires in the totalizing bundles 22.U, D, P, C by suitable decoupling means figured as oblique streaks at the crossing between the wires of these bundles and those of the bundles of translated display outgoing from the said terminals. The numerical details of the translation will be explained below with reference to table FIG. 2A. Each totalizing bundle is connected to a end-of-count "AND" gate 24.U, D, P, C. Moreover, these gates have an inhibition input connected to input 7 and which therefore receives the incoming pulses, so that these gates can only allow a marking to pass during the interval following a pulse. The outputs of these gates are connected through wires 25.U, D, P, C to an input of cycle gates 26.U, D, P, C. The latter are "AND" gates with two inputs, and their other input is connected to the corresponding output wire 20.U, D, P, C in the program unit. By delivering a marking on one or the other of these output wires, the program unit thus determines the totalizing bundle which will set the end-of-count in the position cycle under consideration. The outputs of all the cycle gates 26.U, D, P, C are connected together to wire 17 which applies the end-of-count signal to flip-flop 15 of the cycle restart device. It can be seen that this control device is such that the program unit only prepares an effect which will take place at the end of a position cycle.

Flip-flop 15 transfers the marking from output "0" to output "1" when it receives the end-of-cycle signal at its "0" input. Gate 12 closes and gate 13 opens. The next incoming pulse passes through gate 13 and is applied, through multiple 27, to the resetting inputs of counter 2. In the example represented, the multiple 27 is multipled (with suitable decoupling means figured as oblique streaks) on the "0" outputs of the seven flip-flops of the counter. When the counter is actually reset, the "1" outputs of these flip-flops revert to the rest potential. These outputs are separately connected to the wires of bundle 14 through a connecting bundle 14*a* and inverters inserted in all the wires, so that the resetting of the counter is signally by way of a marking which shows on all the wires of bundle 14 past the inverters. After this pulse which caused the resetting, the "AND" gate 19 opens and delivers a cycle restart signal at input "1" of flip-flop 15. The latter transfers the marking from its "1" output to its "0" output, which again opens gate 12. The next incoming pulses again pass through this gate and are again counted from zero.

The program unit 4 comprises three flip-flops, so that its operation cycle comprises eight positions including position "0." The pulses which make it step forward are the end-of-cycle signals delivered on wire 18 by flip-flop 15 in position "1," from the interval between the penultimate and the last pulse of a position cycle, to the interval between this last pulse and the first one of the next cycle. "AND" gates 28.U, D, P, C have their inputs connected to combinations of the outputs "0" and "1" of the three flip-flops in such a way as to deliver a cycle marking when the program unit is in position "0, 1, 2, 3" respectively. As the cycle of hundreds must still be repeated four times, the output of gate 28.C is connected to one input of an "OR" gate 29 whose other input is connected to the output "1" of the third flip-flop in order to be marked when the program unit is in position "4, 5, 6, 7." Wires 20.U, D, P which open the cycles gates 26.U, D, P originate from the outputs of gates 28.U, D, P, whereas wire 20.C which opens gate 26.C originates from the output of "OR" gate 29 and is marked in the five positions "3 to 7" of the program unit.

The outgoing pulses whose sequence represents the reduced frequency are taken at the "0" output of the third flip-flop of the program unit which is connected through wire 21 to the output terminal 8 of the frequency divider. It has been seen above that the length of these pulses and of their intervals depends on the number of pulses comprised in the first four and the last four position cycles.

The numerical composition of the position cycles, which depends on the displayed digits, will now be explained with reference to table FIG. 2A. This table comprises four sections concerning the cycles of units, tens, make up and hundreds. In the hundreds section, some figures are applicable to the set of the five cycles of hundreds and some others are applicable to each of these cycles, as it will be seen hereafter. The first column gives the displayed digit: $U=0$ to 9 for the units, $D=0$ to 9 for the tens and $C=1$ to 5 for the hundreds. The second column gives the extra count of pulses assigned to each digit: $S_u=6$ for every unit, $S_d=38$ for every ten digit, and for the set of the five cycles of hundreds, a "shorting" $Dpt=75$ or 55, depending on the hundreds digit. Thus, the cycle of tens "2" will comprise 20+38=58 pulses. These two columns are missing in the section of the make up cycle. The third column gives the number of pulses comprised in a cycle with its extra count (or its shorting for the hundreds, where this number still applies to the set of the five cycles). For the make-up cycle, this column gives two figures, to wit 11 and 31, of which the one or the other will be used, depending on the hundreds digit.

The fourth column gives the ends of count, i.e. the numbers of pulses to be counted in the cycles. As the last pulse of the number comprised in a cycle is used for the resetting, the end of count is equal to the number of pulses comprised in the cycle but one. In the hundreds cycles, the end of count applies to each of the five cycles and is therefore equal to $(N_c{:}5)-1$. The fifth column shows the binary form of the ends of count. For instance, for ten "2", the end of count 57 will have the form 1001110 (1+0+0+8+16+32+0=57). The sixth column gives the marking of translated display which is the binary complement of the ends of count. Thus, for the end of count marked 1001110, the translated display will mark 0110001. It will be noticed that wire "1" must be marked by the counter at the end of count of all tens digits: therefore it will never be marked by the translated display of these figures and can be omitted in the display matrix (see FIG. 2). This is indicated in the column "Display" by dots in the binary position "1" instead of indicating "0's." For the tens digit "9," the count reaches the capacity of the counter (127): the counter must mark all the wires in end of count, the display must mark none, and the horizontal input "9" can be omitted, which is also indicated by points in the table. In the make-up cycle, wire "1" is not marked for either of the two values of end of count: it is therefore omitted in the totalizing bundle 22.P (FIG. 2) and replaced by dots in the column "Display" in the table. Wires "2" and "8" must be marked by the counter in both cycles, they therefore must not be marked by the display in either of them, and they are also replaced by dots in the column "Display." In the hundreds cycle, the first two wires are never marked by the counter at the end of count and the third one is marked at each end-of-count: the first two are missing from the totalizing bundle 22.C, and the three of them are replaced by the dots in the column "Display."

In the hundreds cycle, a seventh column gives the number of pulses of the make-up cycle used with the hundred cycle depending on the hundreds digit. An eight column $N_{ct}$ gives the total of the five cycles of hundreds ($N_c$) plus the make-up cycle. This total comprises a shorting of 44 equal to the sum of the extra-counts 6+38 in the units and tens cycles, so that the total number of pulses comprised in the eight cycles of a program is equal to the displayed number.

The various extra counts are chosen so that the ends of count never affect a cascade comprising more than three flip-flops ("1, 2 and 4") in the pulse counter except for the units figure "3" for which the end of count reaches the fourth flip-flop ("8"). This exception will be avoided in the other embodiments. This is a remarkable result, for if the counting was done as usual, an end-of-count ranging from 500 to 600 would operate a cascade of 10 flip-flops. Roughly, the invention would thus allow tripling of the input frequency handled in the frequency divider using components which have the same elementary operating time as those of a frequency divider of the known technique.

Another embodiment will be described with reference to FIG. 3, which shows the composition of the blocks of combined marking 5 and the arrangement of end-of-cycle gates in FIGURE 1, to wit, the bundles 10.U, D, P, C, 11 and 22.U, D, P, C with their multiplying matrices and the end-of-count gates 26.U, D, P, C. The condition of avoiding the fourth flip-flop "8" of the count to be reached at the end-of-count of one of the units figures—a condition which is imposed in this embodiment—implies the use of two different extra-counts in the units cycle. Consequently, the make-up cycle will have two different values, depending on the displayed units figure. Moreover, the extra-counts are chosen in such a way that all cycles of hundreds have the same shorting, and thereby the make-up cycle no longer depends on the displayed hundreds digit. The make-up cycle is therefore associated here to the units cycle.

Referring to table FIGURE 3A which is analogous to table (FIG. 2A), one can see that units 0 to 4 receive an extra-count $S_u=4$, whereas digits 5 to 9 receive an extra-count $S_u=6$. The ends-of-count for digits 0 to 4 are from 3 to 7, and for digits 5 to 9, from 10 to 14: the end of count "8" is avoided in that way. The make-up cycle has two values: $N_p=23$, used for the first five units digits, and $N_p=21$, used for the five other digits, as the seventh column shows. The eighth column shows the total number of pulses for units digits: one sees that this number contains a fixed total extra-count $N_{ut}=4+23=6+21=27$ pulses. One notices that in the make-up cycle, there is only one point of application of the translated marking: that of wire "2" for the value "21" of this cycle. One also notices that only the first flip-flop "1" of the counter operates in the ends of count of tens (as in the preceding embodiment); that the cascade of the first two flip-flops "1,2" operates in all cycles of hundreds; and that the cascade of the first three flip-flops ("1,2,4") at most operates in the cycles of units and of make-up.

In the two embodiments described above, the two alternations of the outgoing waveform are unequal. Now, in certain cases in which a sine wave must be formed from it and still more when harmonics must be extracted from it (such as the harmonic 49 in the example of implementation described in the above mentioned French patent), these unequal alternations create difficulties. An example of implementation in which the outgoing wave has a square form, i.e. with equal alternations, will now be described. One can refer to FIGURE 4 and to table FIG. 4A. The program comprises twice as many positions here, and each position corresponds to a half-position cycle, i.e. to a cycle which contains only half the number of pulses assigned to a display or make-up position. It will be seen that in order not to involve more than three flip-flops in the ends of count of tens, two different extra-counts will have to be used. Under these conditions, the make-up cycle depends on the units and the tens, these two dependancies being however mutually independent.

The second column of the units section in the table FIGURE 4A shows that two extra-counts are alternatively used, viz. $S_u$=20 or 22. The number of pulses comprised in a cycle is always even for an even digit, and it is the odd number immediately below that is comprised in a cycle when the number of pulses is odd (third column). Moreover, these even numbers are divisible by four. The fourth column shows that the ends of count always occur for an odd number in both half-cycles, whereas for the odd number below, they occur for the same odd number in the first half-cycle and for the even number below in the second half-cycle. The translated display (sixth column) therefore never marks wire "1" of the totalizing bundle for the even digits displayed; for the odd digits below, it does not mark it either in the first half-cycle but it marks it under the control of the program unit in the second half-cycle in order to include one pulse less in the count. Beside this special use of wire "1" of the units totalizing-bundle 22.U, one again finds the special use of wire "1" of the make-up bundle 22.P, which is due to the use of two different extra-counts (20 and 22), as in the previous embodiment (noting that the difference of two points between the two extra-counts is expressed here as a one-point difference in each half-cycle).

Figure 4:
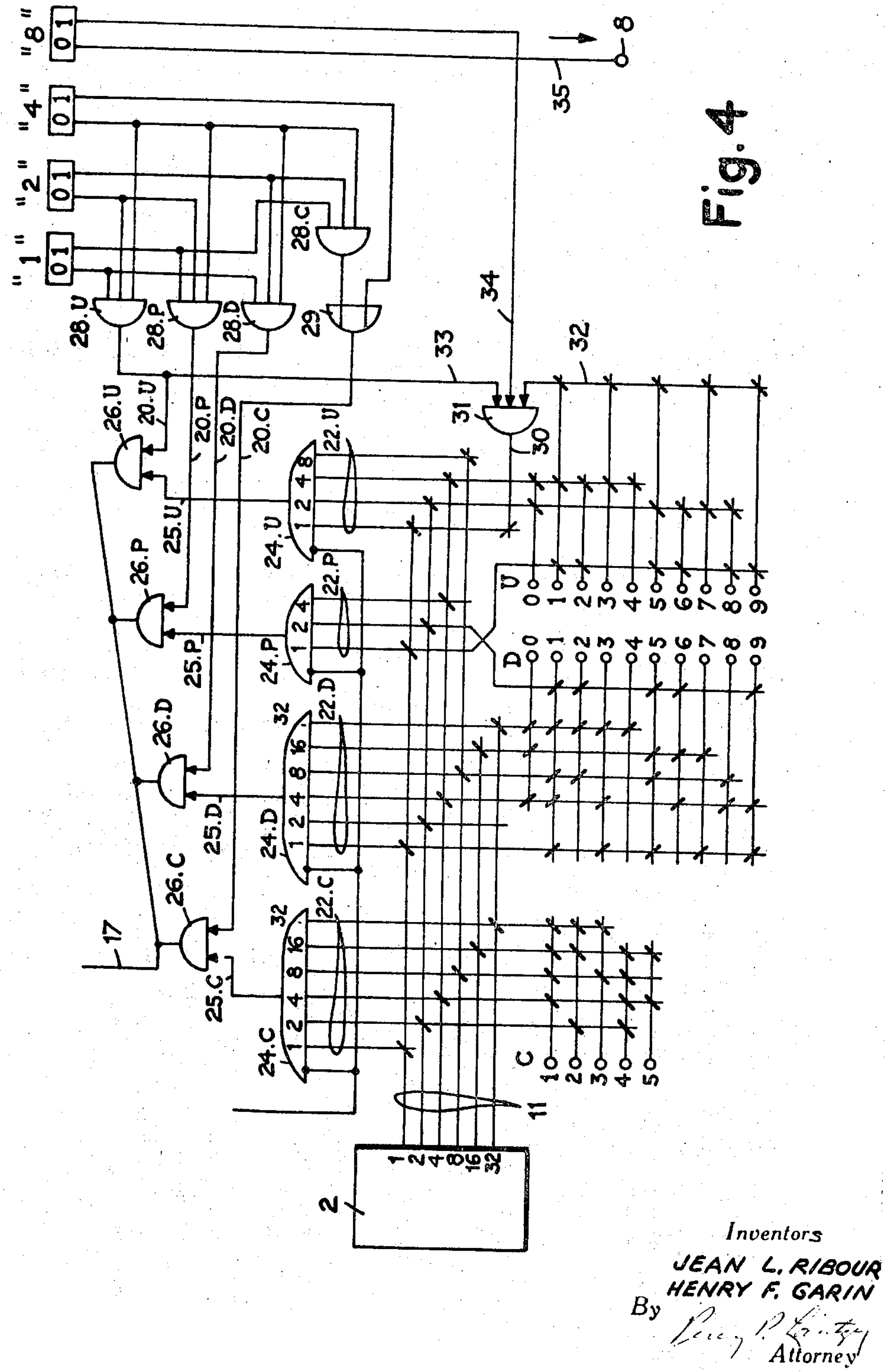
FIGURE 4 is a diagram of the circuits of a third embodiment, with pairs of half-position cycles; and, FIGURE 4A is a corresponding table.

The diagram in FIGURE 4 shows that wire "1" of bundle 22.U is marked by a wire 30 controlled by an "AND" gate 31 with three inputs. The first input is marked by a wire 32 which receives the translated display of the odd units digits; the second input is marked by a wire 33 connected to the output wire 20.U of the program unit (units half-cycle); and the third input is marked by a wire 34 connected to the output "1" of the supplementary flip-flop of the program unit, the one which controls the two half-programs. In this way, the count of pulses for an odd unit ends, in the first half-cycle, on the same number than for the even unit above, and in the second half-cycle, on the same number but one.

To compute the total extra-count to the units digit, only that part $N_{p1}$ of the make-up cycle which depends on the displayed unit figure will be added, namely 0 or 2. The total extra-count will be in that way $$20+2=22+0=22$$

pulses. The rest of the make-up cycle depends on the displayed tens, and it will be added to the tens cycle.

In the tens cycle, two different extra-counts $S_d$=24 or 28 are used here because, with a fixed extra-count, it would be impossible to avoid four of five flip-flops being involved in some ends of count in the series of the half-cycles, which vary here by 5 to 5 pulses and not by 10 to 10 like the cycles in the preceding examples. The two extra-counts differ by 4 points, which makes the two ends of count in the half-cycles differ by 2 points. The make-up cycles here used, therefore differ by 4 points, i.e. 2 points per half-cycle, depending on the displayed tens figure. The rest of these cycles, mentioned above, are chosen $N_{p2}$=10 or 14, which is shown in the seventh column of table FIG. 4A. It follows that the total extra-count for the tens is 28+10=24+14=38 pulses. The shorting in the cycle of hundreds will therefore have to be $$22+38=60$$

pulses.

In the make-up cycle, four different values will be used, namely 10, 12, 14 or 16. The display of units will mark wire "1" of the end of count of the make-up half-cycle (values 10/14 or 12/16), whereas the display of tens will mark wire "2" (values 10/12 or 14/16). In all four cases, the count will have gone beyond flip-flop "4" (wire "4" need not be marked by the translated display). The diagram FIG. 4 shows how wires "1" and "2" of bundle 22.P are marked by the display of units and tens.

The counting and displaying of the half-cycles of hundreds do not present anything special: one will notice however that the number assigned to a hundreds figure is counted here in ten half-cycles instead of five cycles.

The program unit (FIG. 4) therefore comprises a fourth flip-flop to take up the whole series of half-cycles again in both half-programs. The half-cycles are controlled by the first three flip-flops as were the cycles in the preceding embodiments. The outgoing pulses are taken here at the output "0" of the fourth flip-flop, connected by a wire 35 to the output terminal 8. They are square pulses whose alternations differ only by one pulse out of 97 up to 296, which is practically negligible. It will be understood that the pulse counter 2 has one flip-flop less (the seven flip-flops "1, 2, 4, 8, 16, 32") since it counts each time half the number of pulses which is counted in the preceding embodiments.

Needless to say, these embodiments should not limit the scope of the invention. The latter can be embodied in various other modifications, more especially in its adaptation to different reduction ratios. The various components or devices such as gates, flip-flops, counters, decoupling means, marking-means—and particularly the use of the so-called inverted logic—are within the field of the skilled man.

We claim:

1. A variable pulse frequency divider for counting incoming pulses and producing an output pulse for each group of input pulses equal in quantity to the number by which the frequency is being divided, said number having a plurality of digital positions, comprising a pulse counter;

means for applying the input pulses to said pulse counter;

means for setting up physical conditions for each digital position related to the complement of the corresponding digit of said number;

means responsive to the combination of said physical conditions for each digital position and the state of said pulse counter each time it has counted up to a predetermined number assigned to said digital position, to produce a signal; and cyclic programming means responsive to successively selected ones of said signals for controlling said pulse counter and producing an output pulse.

2. A variable pulse frequency divider according to claim 1 further including a cycle counter to count the cycles of said pulse counter and produce an output pulse when a predetermined number of said cycles have been completed.

3. A variable pulse frequency divider according to claim 2 further including means controlled by said cycle counter for successively selecting that one of said signals which corresponds to a successive cycle of said pulse counter, and means controlled by each selected one of said signals for advancing the count of said cycle counter and for resetting the pulse counter for the start of another cycle of counting.

4. A variable pulse frequency divider according to claim 1 in which said programming means includes means for selecting at least twice and in immediate succession signals derived from the combination of the same physical conditions set for a given digital position and the states of at least two successive cycles of said pulse counter.

5. A variable pulse frequency divider according to claim 1 in which said physical conditions associated with one digital position represents a value greater than said complement, whereby the pulse counter counts less pulses than the digital value of said number in said digital position, said divider further including means for counting the excess pulses in a separate correction cycle of said counter.

References Cited

UNITED STATES PATENTS

| | | | |
|---|---|---|---|
| 3,096,483 | 7/1963 | Ranson | 328—42 X |
| 3,137,818 | 6/1964 | Clapper | 328—48 X |
| 3,147,442 | 9/1964 | Fritzsche | 328—41 |
| 3,287,648 | 11/1966 | Poole | 328—48 |

JOHN S. HEYMAN, *Primary Examiner.*